United States Patent [19]

Kaczmarek

[11] Patent Number: 4,876,626

[45] Date of Patent: Oct. 24, 1989

[54] CENTRAL OFFICE PROTECTOR MODULE WITH ALARM INDICATOR

[75] Inventor: Richard Kaczmarek, Chicago, Ill.

[73] Assignee: Reliance Comm/Tec Corporation, Chicago, Ill.

[21] Appl. No.: 202,702

[22] Filed: Jun. 3, 1988

[51] Int. Cl.[4] .............. H02H 9/04

[52] U.S. Cl. .............. 361/119; 361/124; 340/650; 337/32

[58] Field of Search .............. 337/32; 340/650, 651, 340/654, 656, 662, 664; 361/119, 124

[56] References Cited

U.S. PATENT DOCUMENTS

| | | | |
|---|---|---|---|
| 3,587,021 | 6/1971 | Baumbach | 337/32 |
| 3,794,947 | 2/1974 | Baumbach | 337/32 |
| 4,091,435 | 5/1978 | Ahuja | 337/244 |
| 4,168,515 | 9/1979 | Baumbach | 361/124 |
| 4,335,416 | 6/1982 | Hollfelder et al. | 361/119 |
| 4,502,088 | 2/1985 | Baumbach | 361/124 |
| 4,737,776 | 4/1988 | Wireman | 361/119 |

OTHER PUBLICATIONS

Reliable Electric/Utility Products, Reliance Comm/-Tec Corporation-Catalog pp. A-300 and A-301 entitled "Connector Description" dated 1/82.

Reliable Electric/Utility Products, Reliance Comm/-Tec Corporation-Catalog pp. A-305 and A-306 entitled "Resettable Heat Coil Modules" dated 1/82.

*Primary Examiner*—A. D. Pellinen
*Assistant Examiner*—Jeffrey A. Gaffin
*Attorney, Agent, or Firm*—Michael M. Rickin

[57] ABSTRACT

A central office protector module which includes a light to provide a visual indication whenever the module shorts either of the lines protected by the module to groud as a result of either a sustained overcurrent or overvoltage condition on either line. The module includes a sixth or alarm pin in addition to the two line pins, two equipment pins and one ground pin usually included in the module. The module also includes two internal alarm terminals which are each associated with a respective one of the lines. The light is connected to those terminals and a source of voltage. The alarm terminals are connected to ground to complete the circuit to the light when the associated line is connected to ground within the module.

16 Claims, 5 Drawing Sheets

CENTRAL OFFICE PROTECTOR MODULE WITH ALARM INDICATOR

CROSS REFERENCE TO RELATED APPLICATIONS

Of interest are the following copending applications which are all filed on even date herewith and are all assigned to the same assignee as is the present application:

(1) Ser. No. 202,226, entitled "Telephone Distribution Frame Connector Assembly For Use With Central Office Protector Module Having Alarm Indicator" based on the invention of J. Unger, which application discloses a connector assembly into which the module of the present invention may be inserted.

(2) Ser. No. 202,713, entitled "System For Providing Power To A Central Office Protector Module With Alarm Indicator And Including Remote Alarm Indication" based on the joint invention of P. Corvino and T. McCormick, which application discloses a system for among other things providing power to the module of the present invention.

BACKGROUND OF THE INVENTION

1. Field of the Invention

This invention relates to a central office protector module and more particularly to such a module which provides a visual indication when either of the lines protected by the module are shorted to ground.

2. Description of the Prior Art

Telephone operating companies use modules at their central offices to protect the equipment connected to each incoming line. The modules combine protection against excessive voltages with protection against sneak currents. The sneak currents are produced by voltages of relatively low magnitude as compared to the excessive voltages and usually result from accidental interference between telephone lines and adjacent power lines. While sneak currents are not strong enough to do any damage if they flow briefly they may generate enough heat to char insulation and do other damage if they persist.

Protection against excessive voltage is typically provided by a spark-gap protector which generally includes a pair of spaced carbon electrodes or a gaseous discharge device. The spark-gap protector is designed to provide protection against several occurrence of excessive voltage. Generally a solder pellet is included in series with the spark-gap protector so that the heat from a sustained overvoltage will cause the pellet to melt.

Protection against sneak current is typically provided by a device referred to as a heat coil. The heat coil includes a coil of small gauge, high resistance wire which is wound on a metal sleeve sometimes referred to as a bobbin. Inside the sleeve there is a contact pin which holds the bobbin in a predetermined position by a fusible bonding material such as solder. Should excessive currents occur on the line and persist, sufficient heat will be generated by the coil of wire to melt the solder and release the bobbin.

In many of the modules in use today the heat coil, spark-gap protector and solder pellet are typically arranged in series in a conductive enclosure also known as a cup. One end of the heat coil is accessible through the open end of the cup. The bobbin protrudes through that open end. The cup's contents are placed in contact with a line terminal or pin which is connected to the tip or ring conductor of the two wire telephone lines entering the central office. Thus the module provides one protection circuit for the tip conductor and an identical protection circuit for the ring conductor.

To complete the assembly, the module includes a ground terminal and a spring. The spring which is typically of the volute type is interposed between the closed end of the cup and the ground terminal. In the absence of a sustained overvoltage or persistent sneak current condition the cup does not come in contact with the line terminal.

Should a sustained overvoltage condition occur the heat from the operation of the spark-gap protector will cause the solder pellet to melt. The spring then urges the cup downward into contact with the line terminal to thereby ground the same. Should a persistent overcurrent condition occur the heat from the current flowing through the coil will cause the solder holding the bobbin in position to melt. The bobbin can no longer resist the downward force of the spring and the cup is then brought into contact with the line pin to thereby ground the same.

One example of a central office protector module of the type described above is that disclosed in U.S. Pat. No. 4,168,515 entitled "Line Protector For A Communications Circuit" which issued on Sept. 18, 1979 to B. Baumbach. The '515 patent is assigned to the same assignee as is the present invention.

The module of the '515 patent may be modified to have access holes in the module housing so that probes may be inserted into the housing for contact with the tip and ring circuits therein. Such a modification is necessary where the protector panel in which the module is mounted does not include a test field. In addition to the access holes the modified module includes two test terminals each associated with a respective one of the two line circuits. The test terminals are metallic and extend longitudinally in the module housing. One end of each of the test terminals is in electrical contact with the line terminals. The other end of each of the test terminals is in close proximity to the associated access hole. One example of the '515 module modified in the above described manner is disclosed in U.S. Pat. No. 4,502,088 entitled "Line Protector For A Communications Circuit" which issued on Feb. 26, 1985 to B. Baumbach and is assigned to the same assignee as is the present invention.

It is desirable to know at the central office when a persistent sneak current or sustained overvoltage has caused a module to ground either of the line pins. In order for that knowledge to be available to telephone company craftpersons the module must include a means to indicate the occurrence of a ground condition.

There have been several attempts in the prior art to provide such an indicating means in a central office module. Two such are disclosed in U.S. Pat. No. 3,587,021 entitled "Line Protector For A Communications Circuit" which issued on Jun. 22, 1971 and U.S. Pat. No. 3,794,947 entitled "Line Protector For A Communication Circuit" which issued on Feb. 26, 1974. Both the '021 and '947 patents are assigned to the same assignee as is the present invention.

The module of the '021 patent has an indicator which becomes visible when either of the two lines protected by the module sustains an overcurrent condition. For each line the module has an associated heat coil on a printed circuit board. The overcurrent condition allows an associated spring to push the circuit board outward to thereby ground the line. An extension of the circuit board protrudes from an opening in the neck of the housing to thereby indicate the overcurrent condition. The module also includes an alarm pin which is connected to ground when an overcurrent condition occurs. The grounding of the pin can be used to close a circuit in the central office such that an external audible or electric lamp alarm device can be energized.

The module of the '947 patent is an improvement of the module of the '021 patent. The '947 patent discloses two different forms for the module, one of which (shown in FIGS. 1-4) does not use the alarm pin or provide a visual indication and the other of which (shown in FIGS. 8-12) does use the alarm pin and provide a visual indication in the same manner as the module of the '021 patent. Such an alarm indicating module is sold by assignee's Reliable Electric/Utility Products operating unit as the R1104B module. That module plugs into a type 700 connector also sold by that operating unit.

The indicating means of the modules disclosed in the '947 and '021 patents cannot be easily used in the type of module disclosed in either the '515 or '088 patents. In addition, the prior art indicating means is quite complicated and costly to implement. Also the modules disclosed in the '947 and '021 patents have resettable heat coils whereas the module of either the '515 or '088 patents does not.

In summary it is not only desirable that a module of the type disclosed in either the '515 or '088 patents provide a visual indication that a persistent sneak current or sustained overvoltage has caused either line pin to be grounded, but that such indicating means be relatively simple in structure and easily implementable in a cost effective manner. The central office protector module of the present invention meets these requirements.

SUMMARY OF THE INVENTION

A central office protector module which has electrically powered alarm indicating means included as part of the module. The module has a housing which has an end wall and an opening opposite to the end wall. An insulating member forms a base which closes the housing.

First and second line pins project from the base. A ground terminal is in the base. An alarm pin also projects from the base. The module has first and second protection circuits each of which are between an associated one of the line pins and the ground terminal. Each of the protection circuits has a conductive means which comes into contact with the associated one of the line pins when at least one of a predetermined number of conditions occur.

The module also has first and second alarm terminals each associated with a respective one of the protection circuits. The terminals extend from a space between the module housing end wall and the ground terminal to the associated line pin. The electrically powered alarm indicating means has two terminals. Both of the alarm terminals are in connection with one of the indicating means terminals and the alarm pin is in electrical connection with the other terminal.

DESCRIPTION OF THE PREFERRED EMBODIMENTS

Figure 1A:
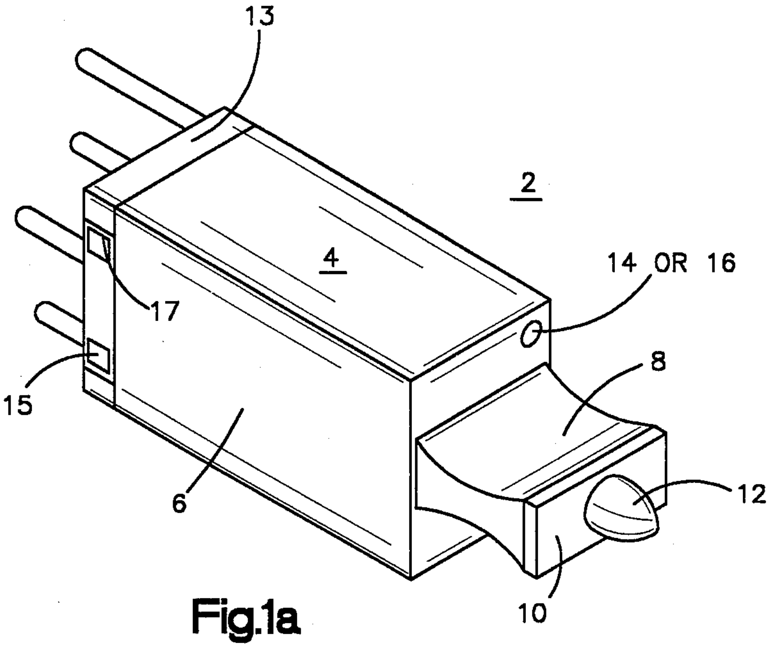
FIGS. 1*a* and 1*b* are, respectively, a perspective and bottom view of an alarm indicating central office protector module embodied in accordance with the present invention.

Referring now to FIG. 1*a* there is shown a perspective view of a central office protector module 2 embodied in accordance with the present invention. Module 2 has a generally rectilinear housing 4. One end of the housing 4 has an end wall 7 which merges into a neck 8 and a flange 10 by which the protector may be gripped for removal from and placement into a plug-in type connector block assembly having wired connections to the incoming outside lines and also to the inside or central office equipment. Mounted in flange 10 is a light emitting diode (LED) 12 for providing an indication that either of the two lines protected by module 2 have been connected to ground by the associated module protection circuit. The end wall 7 has a pair of perforations for openings 14, 16 useable for inserting a probe to test the LED as will be described in more detail hereinafter. At its end opposite to the wall 7 the housing is open, and this opening is closed off by a plastic base 13 containing laterally projecting locking tabs 15. These tabs interlock with a snap fit into openings 17 adjacent to the resilient open end of the housing.

Figure 1B:
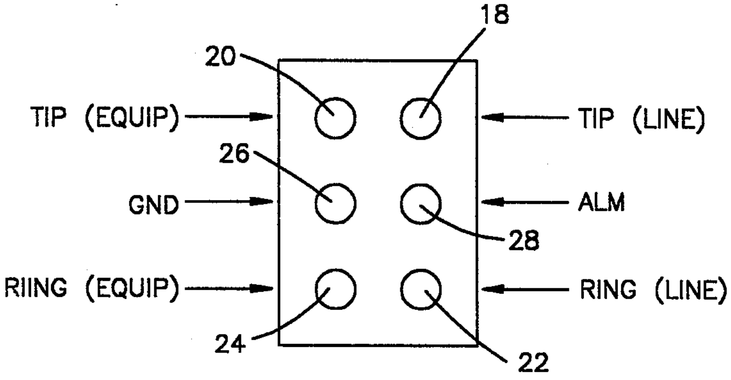

Referring now to FIG. 1*b* there is shown a bottom view of module 2. Projecting through base 13 are conductive plug-in terminals or pins 18, 20, 22, 24, 26 and 28. More specifically there is a first line pin 18, a shorter first central office pin 20, a second line pin 22, a shorter second central office pin 24, a ground pin 26 and an alarm pin 28. The plug-in type connector block assembly has suitably arranged receptacles each associated with a respective one of the pins for receiving the same. The alarm pin has a smaller diameter than the ground pin to make it difficult for a craftsperson to insert the module in the block with the pins reversed.

When the module is inserted into the receptacles the line pin 18 and central office pin 20 are in one of the incoming line pairs (tip or ring) through the protector while the second line pin 22 and its associated central office pin 24 are in the other line circuit through the protector. The ground pin 26 is suitably connected through the plug-in receptacle to ground in a conventional manner. The alarm pin 28 is connected through the plug-in receptacle to a relatively low amplitude positive DC voltage. When either of the two lines protected by module 2 are connected to ground by the module, pin 28 is also connected to ground in the manner described hereinafter. That connection to ground allows a current to flow in pin 28 to thereby light LED 12 to provide a visual indication of the grounding of one of the lines protected by the module.

A detailed description of an embodiment for a connector block assembly which has receptacles for receiving module 2 may be obtained by referring to the copending 202,226 application. An embodiment for a system for providing the relatively low amplitude positive voltage to the assembly is described in the copending 202,713 application.

Figure 2:
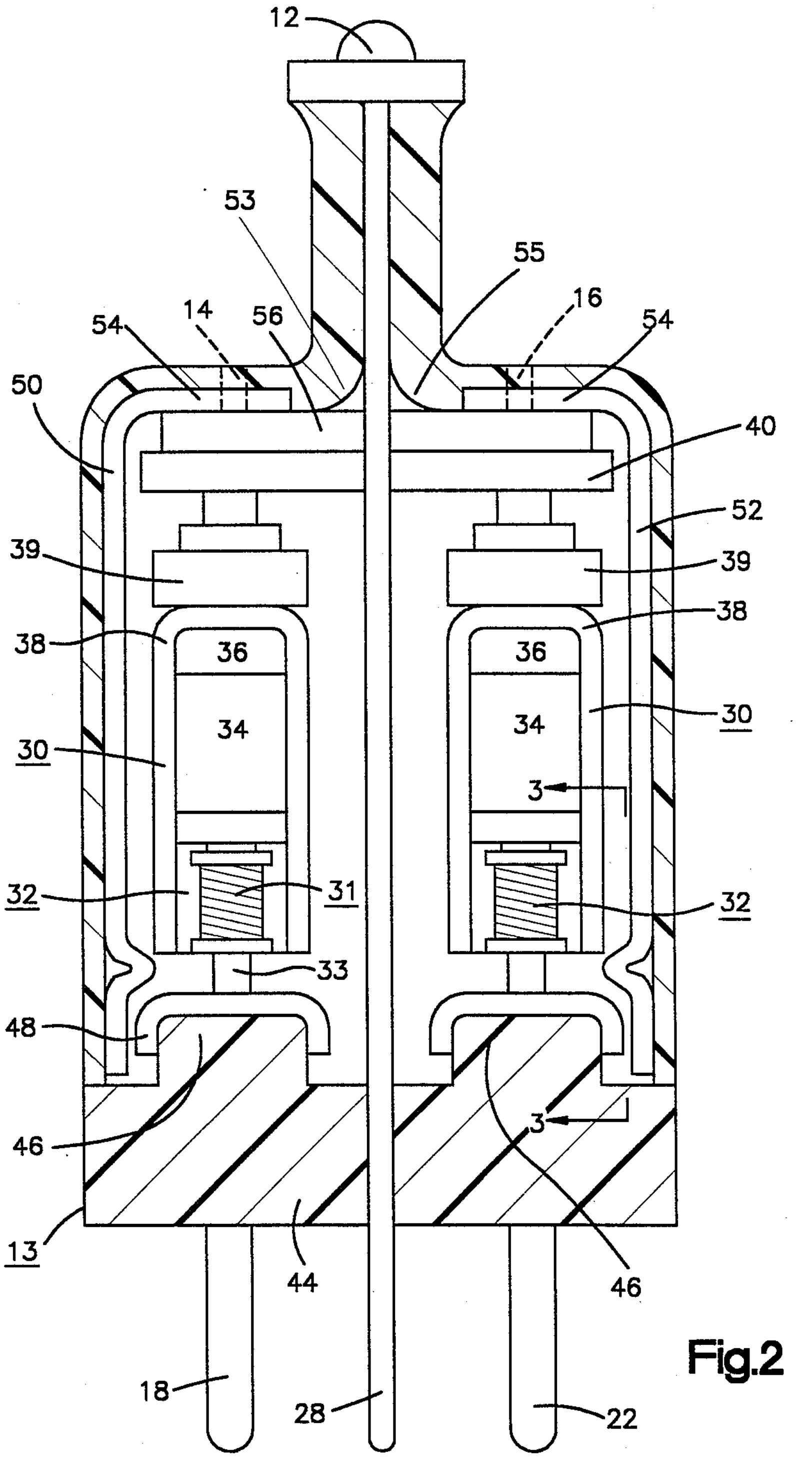
FIG. 2 is a rear elevational view, partially in section of the module of FIG. 1*a* to show a first embodiment for the alarm indicator circuit.

Referring now to FIG. 2 there is shown a rear elevational view, partially in section of module 2. As was previously described module 2 includes two identical protection circuits 30. Each circuit 30 includes a heat coil 32, an overvoltage arrester 34 which may, for example, either be a gas tube or a pair of spaced carbon electrodes, and a solder pellet 36 all included in a conductive cup 38. Each protection circuit 30 further includes a volute spring 39 which is interposed between the closed end of cup 38 and grounding plate 40 which is connected to ground pin 26.

The heat coil 32 includes a metallic bobbin 31 which has a coil of small gauge, high resistance wire wound on it. For ease of illustration the wire has not been shown in FIG. 2. That wire is, however, shown in either the '515 or '088 patents and as is also shown in either of those patents one end of the wire is in permanent electrical contact with the associated one of the line pins 18 or 22 and the other end of the wire is in permanent electrical contact with the associated one of the central office pins 20 or 24. The heat coil 32 also includes a metallic pin 33 which protrudes downwardly from the center of bobbin 31. The pin 33 has one end in contact with the associated one of line pins 18 or 22. The bobbin 31 is held in position by a fusible bonding material such as solder.

Base 13 includes a sub-base 44 of insulating plastic which is of generally rectilinear configuration but also includes a lower step or surface (not shown) and an upper step or surface 46. Step 46 receives a metallic contact plate 48 which has a generally U-shaped cross-section. The plate 48 has a hole (not shown) for receiving the upper end of the associated one of pins 18 or 22 which is upset or staked into rigid and permanent mechanical and electrical contact with plate 48. The plate 48 also has a hole to which the pin 33 is staked. The sub-base 44 has a hole (not shown) through which the associated pin 18 or 22 projects.

While not shown in FIG. 2, the lower step is constructed in a manner similar to step 46 to receive a contact plate and the associated one of pins 20 or 24. It should be clear from FIG. 2 that the one end of pin 33 which is in contact with either of pins 18 or 22 makes that contact through plate 48. The end of the wire wound on bobbin 31 which is in contact either of pins 18 or 22 makes that contact through plate 48 and the end in contact with either of pins 20 or 24 makes that contact through the plate associated with those pins. A more detailed description of the lower and upper steps and associated contact plates may be obtained by referring to either the '515 or '088 patents.

Also within the housing are alarm contact terminals 50, 52 which are formed of sheet metal and which extend generally longitudinally of the housing 4. Each terminal 50, 52 has a large flange 54 which is in close proximity to the associated one of openings 14, 16. The flanges 54 are parallel to but spaced apart from grounding plate 40. A nonconductive spacer 56 is inserted between flanges 54 and plate 40 to ensure that the flanges 54 will not come into electrical contact with plate 40. The spacer 56 also ensures that when module 2 is assembled spring 39 is under load such that upon the melting of either solder pellet 36 or the solder holding bobbin 31 in place the spring 39 forces cup 38 downward to thereby connect the associated one of plates 48 to ground.

Figure 3B:
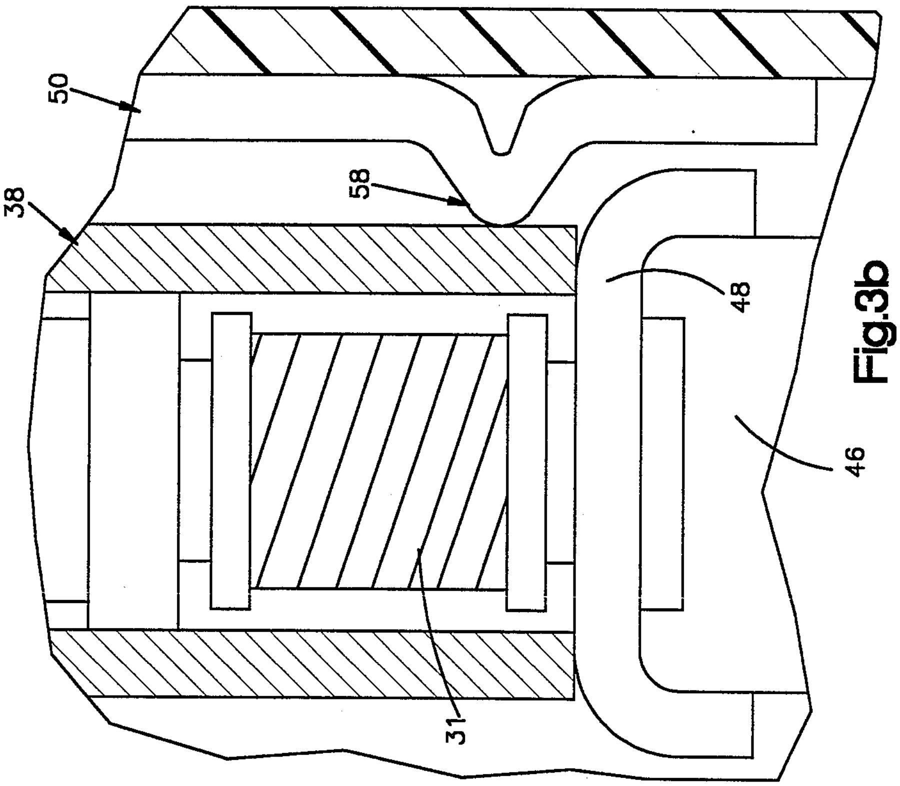
FIG. 3 is an enlarged fragmentary sectional view taken along line 3—3 of FIG. 2 to more clearly show a part of the first embodiment.
FIG. 3*a* is a front elevational view, partially in section of the module of FIG. 1*a* and FIG. 3*b* is an enlarged fragmentary sectional view taken along line 3*b*—3*b* of FIG. 3*a* to more clearly show the connection of the cup to the line plate and alarm terminal.
Figure 3:
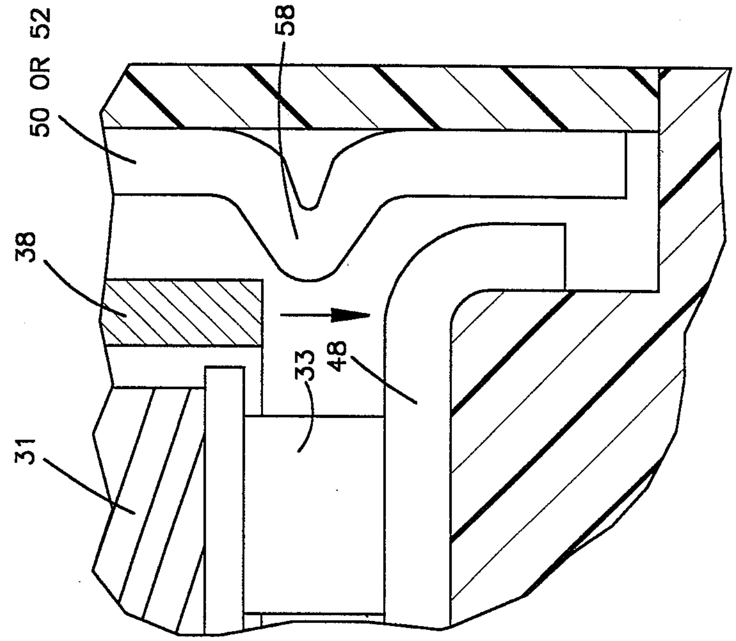

As shown most clearly in FIG. 3, each terminal 50, 52 has at its end adjacent to the housing wall 6, a portuberance 58 which projects into the space which exists between the open end of cup 38 and plate 48 when module 2 is in its normal operating condition, i.e. neither solder pellet 36 or the solder holding bobbin 31 in place has melted. A sustained overvoltage condition will cause solder pellet 36 to melt. The melting of pellet 36 allows spring 39 to force cup 38 downwardly so that the bottom rim of the cup comes into electrical contact with the associated one of plates 48 to thereby connect the associated one of line pins 18, 22 to ground. Simultaneously the outside wall of the cup comes into electrical contact with the portuberance 58 of the associated one of terminals 50, 52 to thereby connect that terminal to ground. In a similar manner a persistent overcurrent condition will cause the solder holding bobbin 31 in place to melt allowing the cup to move downwardly as described above to connect the associated one of the line pins 18, 22 and terminals 50, 52 to ground.

Flange 54 of each of terminals 50, 52 are electrically connected by wires 53, 55 to one terminal of LED 12. The other terminal of LED 12 is electrically connected to alarm pin 28 which is connected to the relatively low amplitude positive DC voltage when module 2 is inserted in the connector block. The contact of cup 38 with the associated portuberance 58 closes the circuit to LED 12. A current flows to light the LED which then provides a visual indication that at least one of the two lines protected by the module 2 has been connected to ground and must be replaced to restore telephone service to the subscriber connected to the outside lines associated with that module.

Figure 3A:
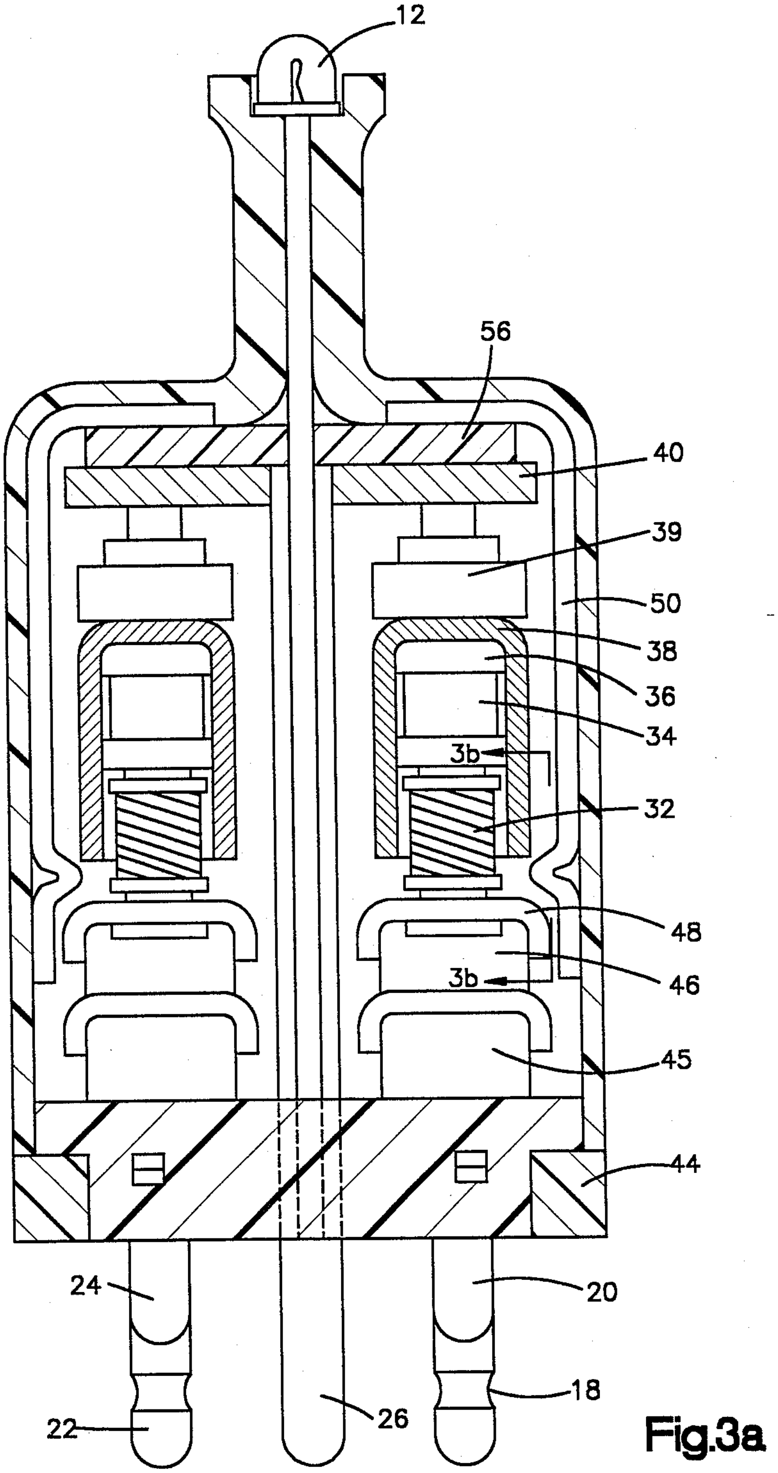

Referring now to FIG. 3*a* there is shown a front elevational view partially in section of module 2, after the occurrence of a persistent overcurrent condition on line 18. This view shows lower step 45 as well as upper step 46 of sub-base 44. This view also shows the connection of ground pin 26 to grounding plate 40.

Referring now to FIG. 3*b* there is shown an enlarged fragmentary sectional view of FIG. 3*a*. FIG. 3*b* shows the connection of the cup 38 to both line plate 48 and alarm terminal 50 as a result of the occurrence of the persistent overcurrent condition on line 18.

From the description given above in connection with FIGS. 2 and 3, it should be clear from those figures as well as FIGS. 3*a* and 3*b* that the persistent overcurrent condition has resulted in the closing of the alarm circuit, i.e. alarm terminal 50 has been connected to cup 38 which in turn is connected by spring 39 to grounding plate 40 and the LED 12 can now light as current will flow therethrough as a result of connecting the alarm pin 28 to the ground through the LED. The alarm circuit also closes in a similar manner as a result of the melting of solder pellet 36.

It should be appreciated that while terminals 50, 52 are similar in many respects to the test terminals shown in the '088 patent they serve a different function. The test terminals shown in the '088 patent are connected at one end to the line pin contact plates. The other end of the test terminals has a flange which lies in close proximity to the associated opening in the module housing. A craftsperson can test the line pins by inserting a test probe into the associated opening. In contrast terminals 50, 52 of the present invention serve both to complete the circuit to the LED and also as a means to test the operation of the LED by inserting one end of a probe the other end of which is connected to ground into the associated one of openings 14, 16. The probe grounds the terminal to thereby close the circuit to the LED in the same manner as would occur upon the occurrence of either a sustained overvoltage or a persistent overcurrent.

There has been shown in FIGS. 2 and 3, 3*a* and 3*b* an embodiment for one means, viz. portuberance 58, which closes the circuit to LED 12 by coming into electrical contact with cup 38 when the cup is forced into electrical connection with plate 48. As was described above, portuberance 58 projects into the space between the bottom of the cup and plate 48. Plate 48 is connected to one of the line pins 18, 22. The line pins are connected to the line pairs from the subscriber premises. In order to provide the power to operate the subscriber's telephone, the central office places −48V on those pairs. Therefore, plate 48 is also at that potential.

The distance between the bottom of the cup and the line plate is quite small. Terminal 50, 52 must be carefully manufactured so that portuberance 58 does not come into contact with the cup and the line plate in normal operation, i.e. before the melting of either the solder pellet or the solder holding bobbin 31 in place. In addition, there is in normal operation a small air gap between the plate and the portuberance. Under some circumstances, an undesirable arc may occur across that gap.

Figure 4A:
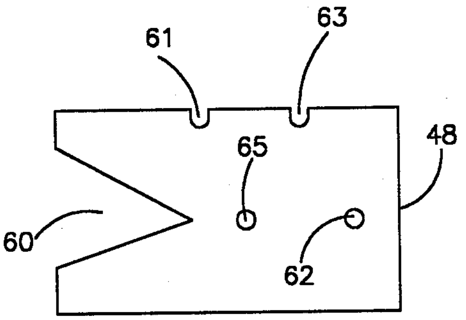
FIG. 4*a* shows a top view of the line plate of the module.

Referring now to FIG. 4*a* there is shown a top view of line plate 48. Plate 48 has a V-shaped notch 60 which faces the front of the module when the plate is mounted on the upper step. The upper end of line pin 18 or 22 is received in hole 62. The heat coil pin 33 while not shown in FIG. 4*a* makes contact with plate 48 by being staked to hole 65 when the module is assembled.

Figure 4B:
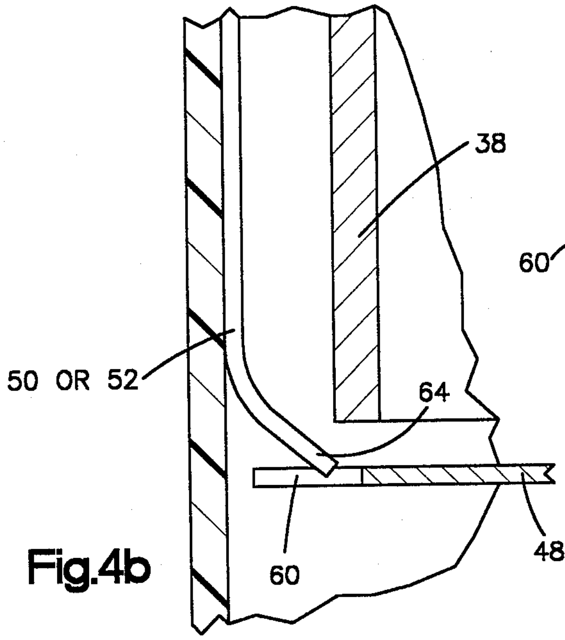
FIG. 4*b* is a partial side sectional view of the module to show a second embodiment for a part of the alarm indicator circuit.

Referring now to FIG. 4*b*, which is a partial side sectional view of module 2 there is shown an embodiment for another means to close the circuit to LED 12. This means takes advantage of the fact that line plate 48 has V-shaped notch 60 in it. For ease of illustration only, the cup 38, line plate 48 and one of the terminals 50, 52 are shown. The only difference between terminal 50, 52 shown in FIG. 4*b* and the terminal 50, 52 described in connection with FIG. 2 is the shape of the terminal at its end 64 adjacent to line plate 48. As terminal 50 or 52 nears the line plate, it is bent so as to project end 64 into the gap between the bottom of cup 38 and plate 48. In particular, the terminal is bent at an angle such that end 64 hovers above V-shaped notch 60 in plate 48. The diameter of the bottom of cup 38 is such that when it comes into contact with plate 48, it covers most of notch 60.

In order to avoid the potential arcing problems described above for portuberance 58, the end 64 of terminal 50, 52 is shaped to be complementary to the shape of notch 60. In other words, end 64 has a V-shaped projection whose point is above and spaced apart from the point where the two legs of notch 60 meet. Upon the occurrence of a sustained overvoltage or a persistent overcurrent either solder pellet 36 or the solder holding bobbin 31 melts and cup 38 is forced downward into contact with line plate 48. At the same time, cup 38 comes into contact with the V-shaped end 64 of terminal 50, 52 to thereby close the circuit to LED 12.

The embodiments for the means by which terminals 50, 52 come into contact with cup 38 shown in FIGS. 2, 3 and 4*b* are static. The portuberance 48 and the V-shaped end 64 are fixedly mounted so as to lie within the space between the bottom of cup 38 and line plate 48. It is the cup which moves to come into contact with either means 48 or 64.

Figure 5:
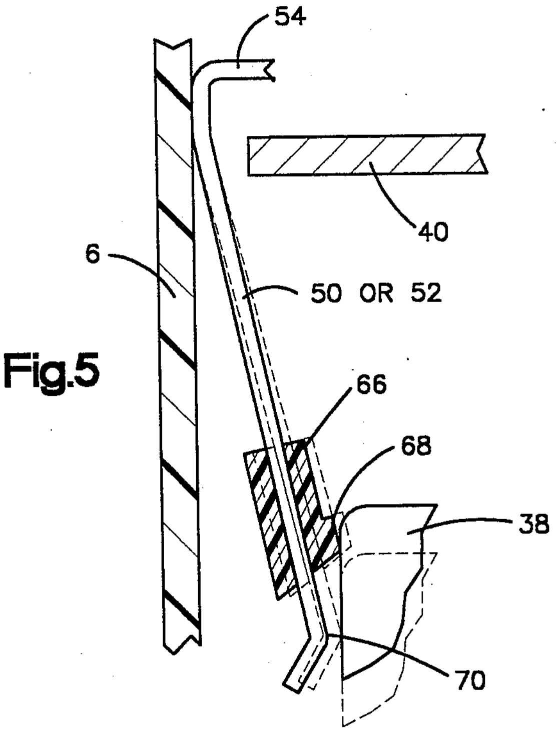
FIG. 5 is also a partial side sectional view of the module to show a third embodiment for a part of the alarm indicator circuit.

Referring now to FIG. 5, there is shown a further embodiment for a means by which terminals 50, 52 come into electrical contact with cup 38. This embodiment differs from those described above in that it is in contact with cup 38 even when the module has not operated to connect the corresponding line pin to ground. This means, as will be described in more detail hereinafter, has a first nonconductive contact with cup 38 when the module has not operated to connect the corresponding line pin to ground. It has a second conductive electrical contact with cup 38 when the module has operated to connect the corresponding line pin to ground.

For ease of illustration, only the terminal 50, 52, the closed end of cup 38 and ground plate 40 are shown in FIG. 5. The terminal 50, 52 is angled inwardly from side wall 6 so as to come into contact with a part of cup 38 which is just below the top edge of the cup when the module has not operated to connect the corresponding line pin to ground. Terminal 50, 52 has a nonconducting sleeve 66 mounted on it in the portion where it makes contact with the cup in the unoperated condition. The sleeve 66 has a projecting portion 68 which is the part of sleeve 66 which is actually in contact with the cup.

At a predetermined location 70 below the sleeve 66, terminal 50, 52 is bent outwardly toward side wall 6. When module 2 is in the unoperated condition, location 70 is not in contact with cup 38.

When cup 38 is caused to move downward, to come into contact with plate 48 as a result of a persistent overcurrent or sustained overvoltage condition, the contact between terminal 50, 52 and cup 38 changes from nonconducting portion 68 to location 70. As location 70 is conductive, the circuit to LED 12 is closed.

It should be appreciated that independent of which embodiment is used for alarm contact terminals 50, 52 that those terminals when connected in combination with LED 12 and alarm pin 28 form an alarm indicator circuit assembly which may be inserted into any type of suitably arranged central office protector module. All that is required is that the module have a conductive component such as cup 38 which makes an electrical contact with either of the alarm terminals when the module connects either of the two line pins to ground upon the occurrence of either a sustained overcurrent or overvoltage. It should further be appreciated that while module 2 has been described as having both overcurrent and overvoltage protective means that the present invention may be used in a module which has only one such protective means.

It is to be understood that the description of the preferred embodiments are intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. A line protector for a communications circuit comprising:
   (a) a housing having an end wall and an opening opposite to said end wall;
   (b) an insulating member forming a base, said member closing said opening;
   (c) at least one line pin projecting from said base;
   (d) a ground terminal in said base;
   (e) an alarm pin for connection to a source of voltage, said pin projecting from said base;
   (f) at least one protection means communicating between said at least one line pin and said ground terminal, said protection means for providing an electrical connection between said line pin and said ground terminal upon the occurrence of any one of a predetermined number of conditions, said protection means permanently providing said electrical connection for at least one of said conditions;
   (g) at least one alarm terminal associated with said protection means, said protection means electrically connecting said alarm terminal to said ground terminal when said protection means permanently provides said electrical connection; and
   (h) electrically powered alarm indicating means having two terminals and mounted in said housing, said alarm terminal in electrical connection with one of said indicating means terminals and said alarm pin in electrical connection with the other of said indicating means terminals such that when said alarm pin is connected to said voltage source and said alarm terminal is electrically connected to said ground terminal current flows through said alarm indicating means to indicate an alarm.

2. The line protector of claim 1 further comprising:
   (i) another line pin projecting from said base;
   (ii) another protection means communicating between said another line pin and said ground terminal, said another protection means for providing an electrical connection between said another line pin and said ground terminal upon the occurrence of anyone of a predetermined number of conditions, said another protection means permanently providing said electrical connection for at least one of said conditions; and
   (iii) another alarm terminal associated with said another protection means, said another protection means electrically connecting said another alarm terminal to said ground terminal when said another protection means permanently provides said electrical connection, said another alarm terminal in electrical connection with said one alarm indicating means terminal.

3. The line protector of claim 2 wherein said electrically powered alarm indicating means is a light emissive device mounted on said housing such that said light is externally visible.

4. The protector of claim 2 wherein said ground terminal extends towards said end wall and has a projection adjacent to and in spaced relationship to said end wall, said one protection means communicating between said one line pin and said projection and said another protection means communicating between said another line pin and said projection, said one and said another alarm terminals each extending from a space between said end wall and said projection towards said associated one of said one and said another line pins and said protector further comprises insulating means interposed between said alarm terminals and said projection.

5. The line protector of claim 1 wherein said electrically powered alarm indicating means is a light emissive device mounted on said housing such that said light is externally visible.

6. The line protector of claim 1 wherein said one protection means comprises means responsive to the occurrence of an overvoltage condition for providing said electrical connection between said one line pin and said ground terminal, said means also responsive to the occurrence of a sustained overvoltage condition for providing said permanent electrical connection between said one line pin and said ground terminal.

7. The line protector of claim 6 wherein said protection means further comprises means responsive to the occurrence of a sustained overcurrent condition for providing said permanent electrical connection between said one line pin and said ground terminal.

8. A line protector for a communications circuit comprising:
   (a) a housing having an end wall and an opening opposite to said end wall;
   (b) an insulating member forming a base, said member closing said opening;
   (c) first and second line pins projecting from said base;
   (d) a ground terminal in said base;
   (e) an alarm pin for connection to a source of voltage projecting from said base;
   (f) first and second protection circuits each associated with a respective one of said first and second line pins and communicating between said associated line pins and said ground terminal and each having protective means and conductive means, said protective means between an associated one of said line pins and said associated conductive means, each of said conductive means connected to said ground terminal, each of said protective means for providing an electrical connection from said associated one of said line pins to an associated one of said conductive means upon the occurrence of any one of a predetermined number of conditions, each of said conductive means being brought into permanent connection with said associated line pin to thereby shunt said associated protective means for at least one of said conditions;
   (g) first and second alarm terminals each associated with a respective one of said protection circuits, said associated one of said conductive means connecting said associated line pin to said associated one of said alarm terminals when said conductive means shunts said associated one of said protective means; and
   (h) electrically powered indicating means having two terminals and mounted in said housing, both of said alarm terminals in electrical connection with one of said indicating means terminals, said alarm pin in electrical connection with the other of said indicating means terminals such that when said alarm pin is connected to said voltage source and either of said alarm terminals are connected to said ground terminal current flows through said alarm indicating means to indicate an alarm.

9. The line protector of claim 8 wherein said first and second alarm terminals each extend from a space between said line protector housing end wall and said ground terminal towards said associated one of said line pins.

10. The line protector of claim 9 wherein said ground terminal extends toward said end wall and has a projection adjacent to and in spaced relationship to said end wall, said first protection circuit communicating between said first line pin and said projection and said second protection circuit communicating between said second line pin and said projection, and said protector further comprises insulating means interposed between said alarm terminals and said projection, each of said alarm terminals extending towards said associated one of said line pins from a space between said end wall and said insulating means.

11. The line protector of claim 10 wherein each of said alarm terminals has a portuberance in the vicinity of said associated line pin which projects toward said associated protective means, said associated conductive means making an electrical connection with said associated alarm terminal portuberance when said associated conductive means is brought into said permanent connection.

12. The line protector of claim 8 wherein each of said protective means comprises means responsive to the occurrence of an overvoltage condition for providing said electrical connection from said associated one of said line pins to said associated one of said conductive means, said means also responsive to the occurrence of a sustained overvoltage condition for providing said permanent electrical connection between said associated conductive means and said associated line pin.

13. The line protector of claim 12 wherein each of said protective means further comprises means responsive to the occurrence of a sustained overcurrent condition on said associated line pin for providing said permanent electrical connection between said associated conductive means and said associated line pin.

14. An assembly for indicating an alarm in a line protector for a communications circuit which has first and second line pins, a ground assembly and first and second protection circuits each associated with a respective one of said first and second line pins and communicating between said associated line pin and said ground assembly and each having protective means and conductive means, said protective means between an associated line pin and said associated conductive means for providing an electrical connection from said associated line pin to said associated conductive means upon the occurrence of any one of a predetermined number of conditions, each of said conductive means connected to said ground assembly, each of said conductive means being brought into permanent connection with said associated line pin to shunt said associated protective means for at least one of said conditions, said assembly comprising:

(a) first and second conductive alarm terminals each associated with a respective one of said protection circuits;

(b) an alarm pin for connection to a source of voltage; and (c) electrically powered alarm indicating means having two terminals, both of said alarm terminals in electrical connection with one of said indicating means terminals, said alarm pin in electrical connection with the other of said alarm indicating means terminals, an associated one of said conductive means connecting an associated one of said alarm terminals to said ground assembly when said alarm indicating assembly is inserted in said module and said conductive means permanently connects said associated one of said line pins to said ground assembly, such that when said alarm pin is connected to said voltage source current flows through said alarm indicating means to indicate an alarm.

15. The assembly of claim 14 wherein said alarm indicating means is a light emissive device.

16. The assembly of claim 14 wherein said line protector has a housing which has an end wall and an opening opposite to said end wall; an insulating member forming a base for closing said opening and said ground assembly is in said base and extends towards said end wall and has a projection which is adjacent to and in spaced relationship with said end wall, said line protector also including insulating means above said projection and in spaced relationship to said end wall, said first protection circuit communicating between said first line pin and said projection and said second protection circuit communicating between said second line pin and said projection, each of said alarm terminals extending towards said associated one of said line pins from a space above said insulating means but below said end wall when said alarm indicating assembly is inserted in said line protector.

* * * * *